United States Patent [11] 3,609,036

| | | |
|---|---|---|
| [72] | Inventor | Warren D. Novak<br>Chappaqua, N.Y. |
| [21] | Appl. No. | 829,231 |
| [22] | Filed | June 2, 1969 |
| [45] | Patented | Sept. 28, 1971 |
| [73] | Assignee | The Mosler Safe Company<br>Hamilton, Ohio |

[54] GEARLESS CAMERA-FOCUSING APPARATUS
25 Claims, 8 Drawing Figs.

[52] U.S. Cl. .................................................. 355/58,
95/45, 178/5.4 E, 178/7.92, 355/58
[51] Int. Cl. ......................................................... G03b 27/36
[50] Field of Search .......................................... 178/5.4 E,
7.92, 72 E; 95/45; 355/58

[56] References Cited
UNITED STATES PATENTS
| | | | |
|---|---|---|---|
| 1,583,979 | 5/1926 | Lare ............................ | 355/58 |
| 2,515,104 | 7/1950 | Walker ........................ | 95/45 |

*Primary Examiner*—Robert L. Griffin
*Assistant Examiner*—Donald E. Stout
*Attorney*—Wood, Herron & Evans

ABSTRACT: A variable-magnification closed-circuit television system. The system comprises an adjustment mechanism for synchronously positioning a lens and a camera relative to an objective so as to enable the lens to both magnify and reduce the image while always maintaining the image accurately in focus. The adjustment mechanism comprises a plate cam for positioning the lens and a crank driven from the plate cam for positioning the camera.

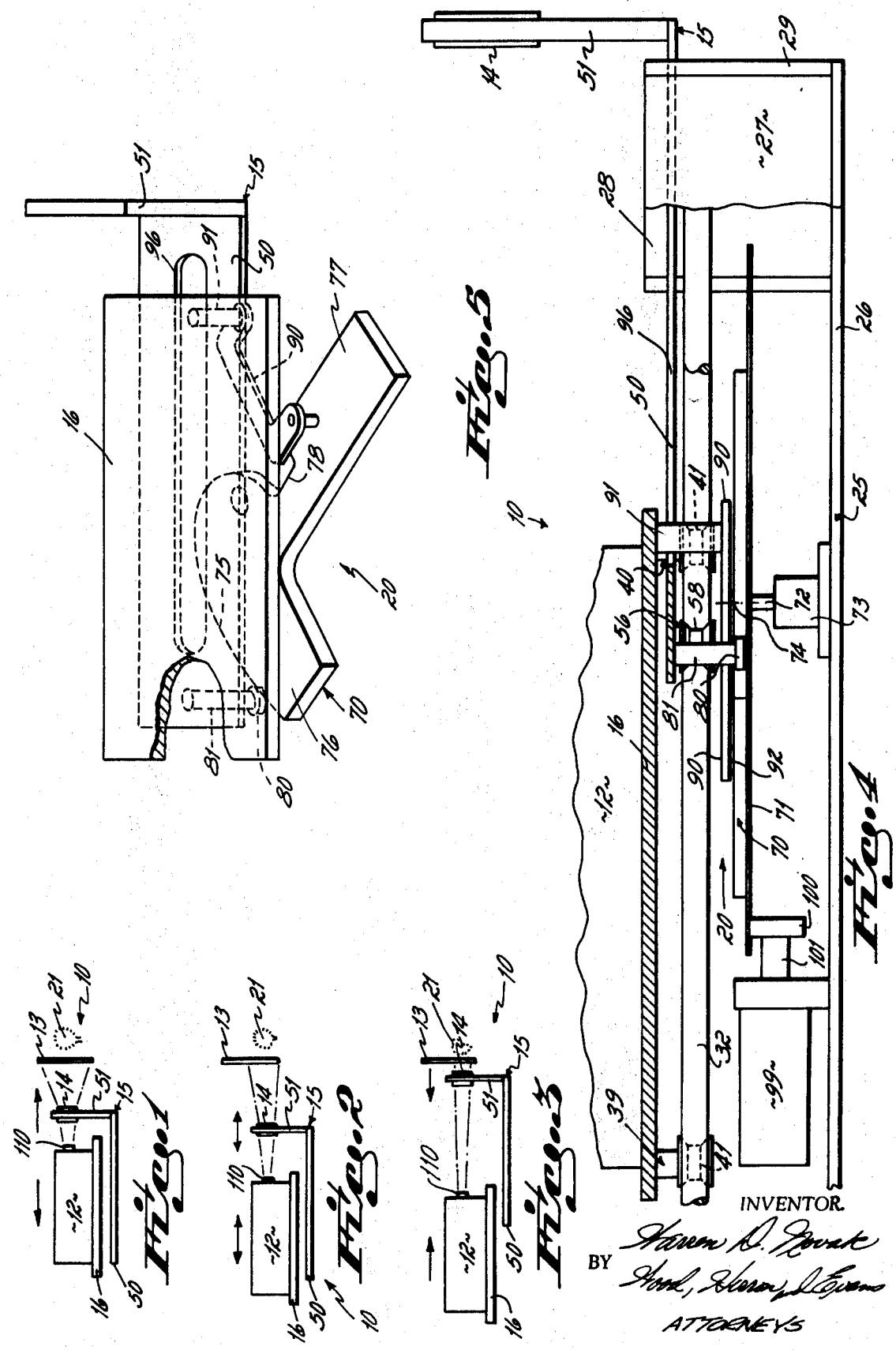

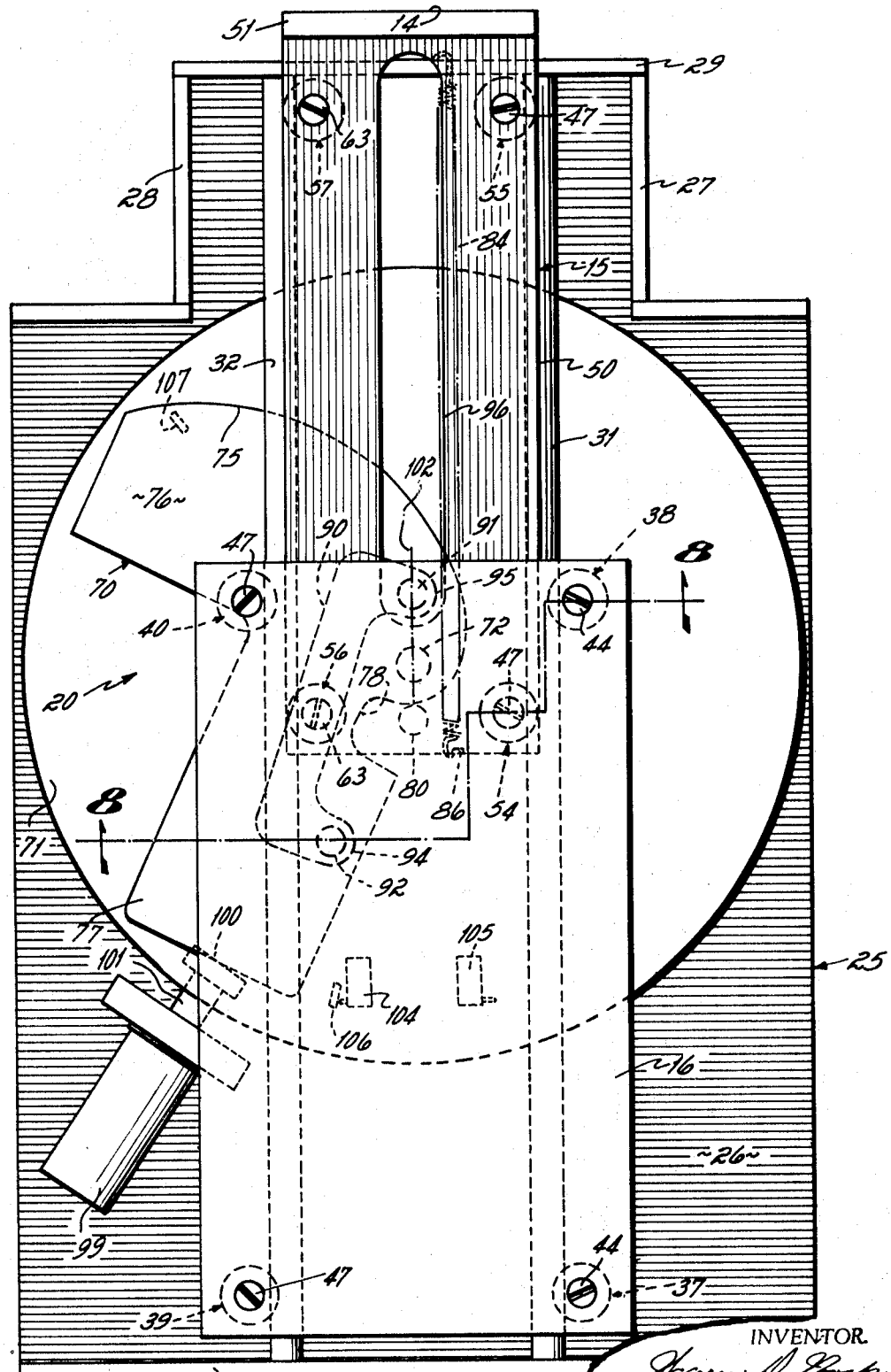

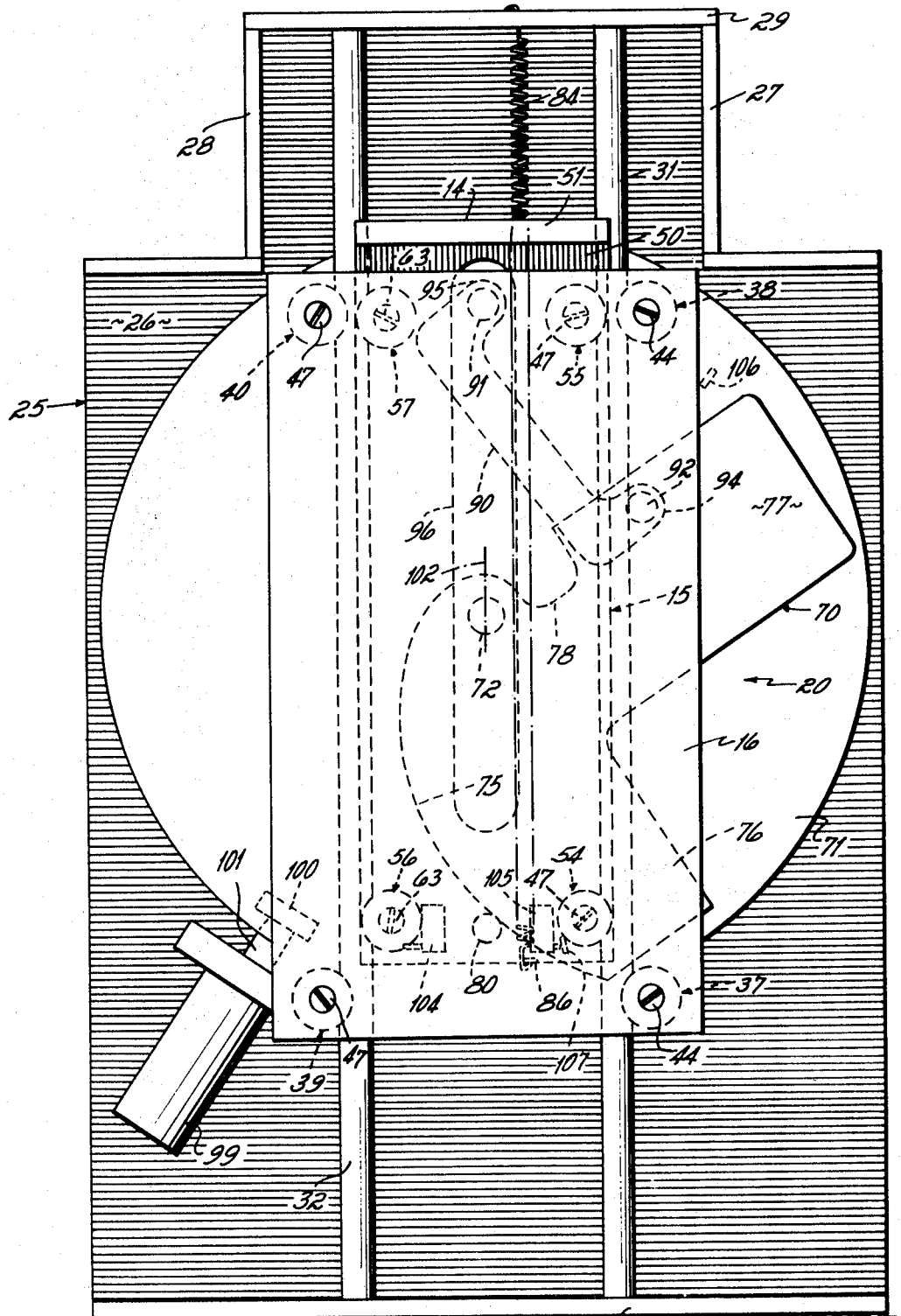

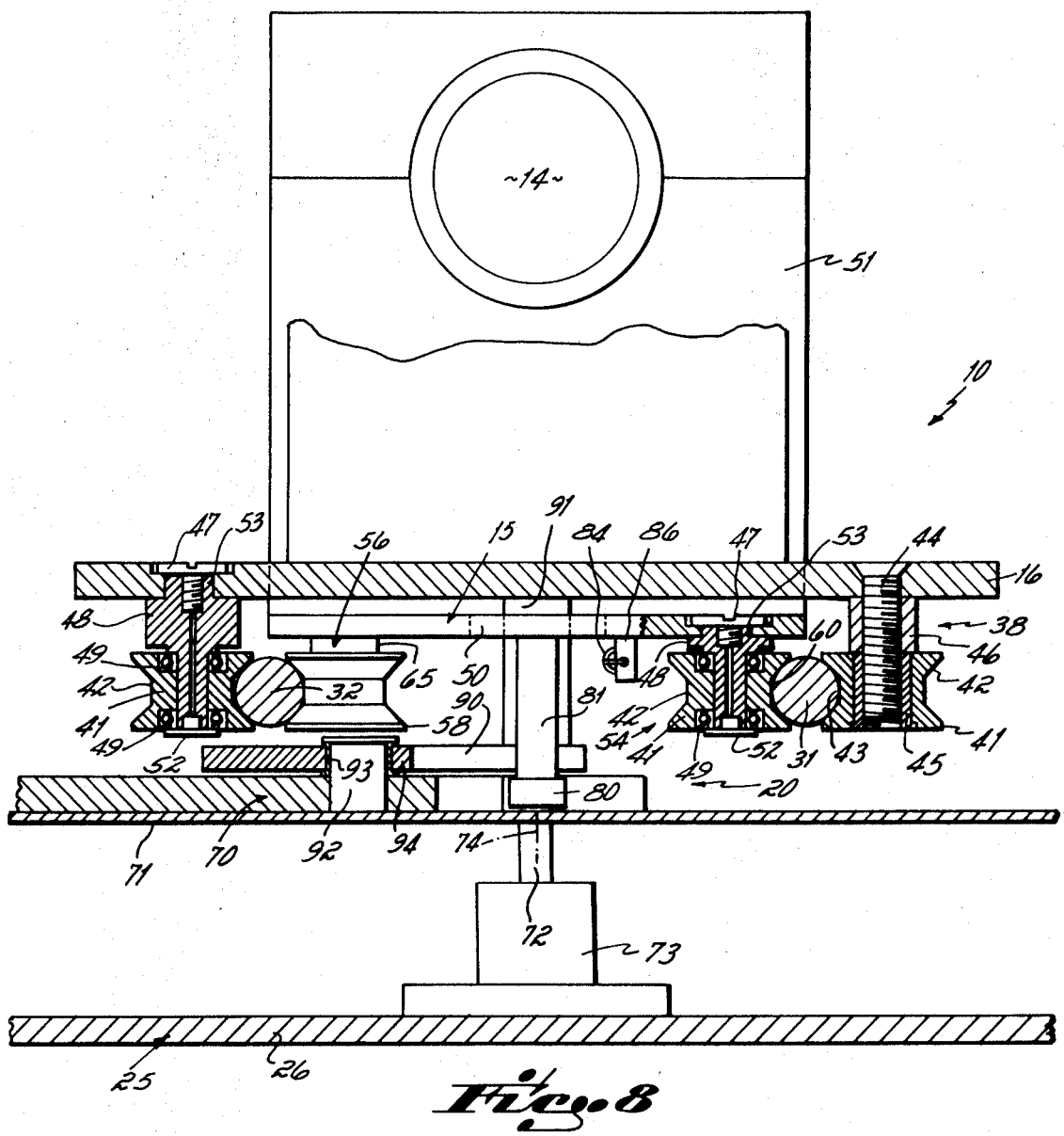

GEARLESS CAMERA-FOCUSING APPARATUS

This invention relates to optical viewing systems and particularly to a television or movie camera viewing system or to an optical projecting or copying system for displaying or copying objects or microfilm images of objects. The system is operable to accurately and synchronously position both the lens and the image display device relative to a stationary plane of the objective or to position the lens and the plane of the objective relative to the stationary plane of the image so as to vary the magnification of the objective.

It is well known by everyone who has ever viewed an object through a magnifying lens that changing the magnification of the objective requires movement of the magnifying lens and simultaneous movement of the eye to maintain the objective in focus. The formula which determines the distance the eye must be located from the lens and the lens from the objective is $1/f = 1/D_o + 1/D_i$ where $f$=the focal length of the lens, $D_o$=the distance of the objective from the lens and $D_i$=the distance of the image or the eye from the lens. The magnification is determined by dividing $D_o$ by $D_i$. These same formulae obtain whether the image is viewed on a mirror, or a screen, by the naked eye, on a vidicon tube of a television camera, or is recorded on film.

Within the last ten or fifteen years, closed-circuit television systems have become very common and the need has grown for a variable-magnification closed-circuit system which allows a viewed object to be enlarged or reduced at the will and under the control of a viewer of a closed circuit system. To satisfy this need there have been system proposed which did magnify the objective and which to at least some degree maintained the relationship set forth above between the objective, the lens and the camera. However, all of these systems have severe shortcomings; either in the range of image magnification or reduction, or in the quality of the image because of the failure of the system to accurately maintain the positional relationship called for by the formula.

It has therefore been a primary objective of this invention to provide an optical viewing system which provides a very large range of image magnification and/or reduction and which very accurately maintains the focus of the image throughout this range.

Still another objective of this invention has been to provide a continuously movable optical viewing system which is capable of both image reduction and image enlargement while faithfully and accurately maintaining the focus of the image throughout the range. In other words or otherwise expressed, an objective of this invention has been to provide an optical viewing system continuously movable through a large magnification range ($D_o/D_i$) from less than one to much greater than one. In actuality, the optical system of the preferred embodiment of this invention is capable of accurately and continuously maintaining the focus of an object throughout a magnification range ($D_o/D_i$) from 1/6 to 6.8. When combined with the magnification of a closed-circuit television system, this optical system provides a magnification range ($D_o/D_i$) from 8 to 300 throughout which the system is always accurately in focus.

There has been at least one prior attempt to attain the same objectives as set forth hereinabove. This prior attempt however involved the use of a drum cam for synchronously controlling movement of both the viewing lens and a TV camera relative to the stationary plane of an objective. While drum cams are operable in this environment, they inherently cannot obtain the necessary resolution of the focus throughout a wide range of magnification. The primary reason that drum cams are inherently unsuitable to this application is that drum cams require a cam follower, such as a pin or roller, to extend into a track on the cam. The follower must track on one side or the other of the cam trackway and there must be clearance provided between the roller and the other side of the cam trackway. Necessarily then, the roller must be movable within the trackway to the extent of the clearance. When the cam trackway extends nearly parallel to the axis of the drum the cam follower is movable through a relatively large range of clearance in the cam trackway. This range of movement of the cam follower in the trackway is too great even in the most accurately machined drum cams to permit accurate focus of a high magnification optical system.

It has therefore been another objective of this invention to provide a high magnification, accurate focus optical viewing system which eliminates drum or roller type cams from the system.

The primary advantage of roller or drum style cams in optical viewing systems and the primary reason that they have heretofore been commonly used is that two separate cam trackways may be machined in the same drum and may cross each other so as to allow two followers operating in two separate paths to pass each other axially on the drum. This characteristic enables the drum-style cam to be used in a wide magnification range system which goes from a magnification of less than one to greater than one and thereby requires the followers to either come into close abutment or to pass one another, depending upon the orientation of the lens and the camera and/or the linkage system between the lens and the camera and the connected follower.

Another reason that drum-style cams have been used heretofore is that they are relatively compact and provide a wide range of cam follower movement from a relatively compact cam surface.

It has therefore been another objective of this invention to provide a mechanical cam and cam follower system for controlling movement of a lens and of an image-viewing camera or projector without the use of a drum can and without sacrificing compactness of the cam assembly and/or range of magnification.

These objectives are attained and one aspect of this invention is predicated upon the concept of moving a magnifying lens under the control of a plate cam while simultaneously and synchronously moving a camera or projector supporting platen by means of a crank arm which is driven directly from the plate cam. The linkage between the plate cam and the lens consists of a spring-biased cam follower acting against the plate cam while the crank arm extends from the cam upwardly through a slot in the lens-carrying platform and is connected directly to the camera or projector supporting platen. By extending the connecting pin between the crank arm and the camera-supporting platen through a slot in the lens-mounting platen the two carriages, the lens carriage and the camera carriage, may occupy the same axial spatial position and the size of the unit is thereby reduced without sacrificing range of magnification.

To the end of minimizing the size of the unit while simultaneously eliminating alignment problems between the two movable carriages, the system of this application utilizes a novel carriage mounting guide and guideway arrangement. Since the two carriages must move over each other the guideways must move past each other. The mounting arrangement of this invention enables the guideways of both carriages to move past each other while simultaneously being mounted upon the same pair of guide rods. This is accomplished by guiding one carriage on the outside surface of the two rods while simultaneously guiding the other carriage on the inside surface of the same two rods.

To reduce the size motor required to drive the plate cam of the system, the plate cam is mounted upon a circular disc. The periphery of this disc is motor driven by a friction drive roll. By utilizing the large moment arm of the disc to advantage, the torque required to rotate the cam and thus effect movement of the camera-carrying platen and the lens-carrying platen is minimized.

The primary advantage of the system heretofore described resides in the wide range of magnification which it provides in a system which accurately maintains the focus of the system throughout the range of magnification and in a very compact assembly.

These and other objects and advantages of this invention will be more readily apparent from the following description of the drawings in which:

FIG. 1 is a diagrammatic side elevational view of a variable-magnification closed-circuit television system illustrating the lens and camera position relative to an objective for image reduction, FIG. 2 is a perspective diagrammatic illustration similar to FIG. 1 but illustrating the lens and camera position relative to an objective for medium range magnification, FIG. 3 is a view similar to FIG. 1 but illustrating the lens and camera position relative to an objective for high magnification, FIG. 4 is a side elevational view, partially broken away, of one preferred embodiment of a variable-magnification closed-circuit television system incorporating the invention of this application, FIG. 5 is a diagrammatic perspective view of the camera-carrying platen, the lens carriage, and the cam adjustment mechanism of the variable-magnification system of FIG. 4, FIG. 6 is a top plan view of the variable-magnification closed-circuit television system of FIG. 4 illustrating the position of the cam adjustment mechanism for high magnification, FIG. 7 is a top plan view similar to FIG. 6 but illustrating the position of the cam adjustment mechanism for low magnification, and FIG. 8 is a cross-sectional view through the system taken on line 8—8 of FIG. 6.

In one preferred embodiment, the invention of this application is described as embodied in a variable-magnification closed-circuit television system for viewing microimages on film chips or microfiche. This is however just one application for this variable-magnification system. The same closed-circuit television system has been used to view opaque micro-objects in which event the objects are frontlighted rather than being backlighted as in the case of film chips and images on microfiche.

In addition to its use in closed-circuit television systems, the variable-magnification system of this invention is equally applicable to microfilm readers and reader printers or for use in combination with conventional movie cameras or even still cameras. In these latter systems, an image is focused on a camera film or a screen rather than a television camera vidicon tube. The advantages of this invention though accrue equally in all of these applications.

Referring first to FIGS. 1–3, it will be seen that the variable-magnification closed-circuit television system 10 of this invention comprises a television camera 12 for viewing a microimage card or objective 13 through a magnifying lens 14. To enable the magnification of the objective 13 to be varied, the lens 14 is mounted upon a movable carriage 15 and the camera 12 is mounted upon a movable platen 16. Movement of the lens-carrying carriage 15 and the camera-carrying platen 16 is controlled by an adjustment mechanism 20 (FIG. 5). This adjustment mechanism 20 maintains the vidicon tube (not shown) of the television camera 12 in focus in various magnifying positions of the lens 14 by controlling movement of both the carriage 15 and the platen 16 in synchronization so that the vidicon tube of the camera remains in the focal plane of the image in all magnifying positions of the lens 14.

In one preferred embodiment, the objective 13 is either a microfiche film card or a card having microfilm chips mounted in apertures of the card. In either event, the card 13 is backlighted by a variable-intensity light force 21 and is preferably movable sidewise or vertically in a single vertical plane. Both the intensity of the light and the movement of the care 13 are automatically controlled by a drive motor synchronized with the lens position. In this preferred embodiment the light intensity varies directly with the magnification and the edgewise translation speed of the microfilm or micro-object varies inversely with the magnification. The mode of adjustment of the light intensity and the card position form no part of this invention and have therefore not been described in detain herein.

The same variable-magnification closed-circuit television system 10 described herein has also been used for viewing micro-objects mounted upon slides located in fixed vertical plane. The only difference is that the micro-object, being opaque, must be frontlighted rather than backlighted.

Referring now to FIGS. 4 through 8, it will be seen that the variable-magnification closed-circuit television system 10 is mounted upon a fixed or stationary base or frame 25. This frame comprises a baseplate 26 from which a pair of sideplates 27 and 28, a front plate 29, and a rear plate 30 extend upwardly. A pair of circular cross section guide rods 31 and 32 extend between and are rigidly fixed to the front 29 and rear 30 frame plates. These guide rods 31 and 32 support and guide axial sliding movement of the camera platen 16 and the lens carriage 15.

The television-camera-carrying platen 16 comprises a flat plate from which four cornerposts 37, 38, 39 and 40 extend downwardly. Rollers 41 are rotatably journaled on the lower end of each of these posts. Each of these rollers 41 has a V-shaped groove 42 in its peripheral surface which bears against and rides over the outside edges or surfaces 43 of the guide rods 31 and 32. The flat V-shaped surfaces of these rollers make only line contact with the rods so that friction between the two is minimized.

As may be seen most clearly in FIG. 8, two of the posts 37 and 38 are nonadjustable fixed axis posts and the two other posts 39 and 40 are eccentric axis adjustable posts. The fixed axis posts 37, 38 consist of a screw 44 which extends downwardly through the platen 16 and is threaded into a bushing 45 upon which the roller 41 is rotatable. The bushing is spaced from the bottom of the platen by a spacer sleeve 46.

The two adjustable posts 39 and 40 different in construction from the two posts 37 and 38 so as to provide precise adjustment of the posts and the attached rollers 41 toward and away from the guide rod 32. These posts 39 and 40 each comprise a central depending roller support post 48 which has an eccentric neck 53 located within an aperture of the platen 16. The post is in turn secured to the platen by a locking screw 47 threaded into the top of the post 48. The roller 41 is mounted over the lower end of the post 48 and is supported for rotation upon preloaded ball bearings 49. A press-fit pin 52 in the bottom of the post holds the roller 41 on the post.

To adjust the rollers 39 and 40 relative to the guide rod 32 and thus relative to the two other rollers 37 and 38, the locking screw 47 is loosened and the post rotated relative to the platen 16. Because the neck 53 of the post is eccentric to the vertical centerline of the post 48, rotation of the post 48 within the aperture of the platen effects movement of the post and thus the attached roller 41 toward and away from the rod 32.

The lens-carrying carriage 15 comprises a flat plate 50 slidably mounted beneath the camera-carrying platen 16. At its forward end, the plate 50 has a bracket 51 extending upwardly therefrom. The magnifying lens 14 is fixedly mounted within this bracket 51.

As may be seen most clearly in FIGS. 6 and 8, the lens-carrying plate 50 also has four cornerposts 54, 55, 56 and 57 extending downwardly from it. At its lower end, each of these posts rotatably journals a roller 58. The rollers 58 also have V-shaped grooves cut from their peripheral surfaces. These grooves fit over the inside surface 60 of the guide rods 31 and 32 so that the rollers slidably carry the carriage 15 over the rods.

The two cornerposts 56 and 57 of the lens carriage both are nonadjustable and comprise a machine screw 63 which extends downwardly through the plate 50 and is threaded into a bushing 64 over which the roller 58 is rotatable. A spacer 65 separates the top of the roller 58 from the bottom of the plate 50.

The cornerposts 54 and 55 are both eccentrically adjustable relative to the guide rod 31. To this end, they are identical in construction to the posts 39 and 40 of the platen 16 and accordingly, corresponding parts of the posts 54 and 55 have been given numerical designations identical to the designations of the corresponding parts of the posts 39 and 40.

Since both the camera plate 16 and the lens carriage are slidably mounted upon the same guide rods 31 and 32, the platen being supported on the outside edges of the rods and the carriage being supported on the inside edge, the carriage and platen always move in parallel and there is no problem of misalignment and poor focusing because of the two being out of parallel alignment.

Referring now to FIG. 5 it will be seen that axial movement of both the camera platen 16 and the lens carriage 15 is controlled by rotation of a cam 70. This cam 70 is fixedly secured to the top surface of a disc 71 (FIGS. 4, 6 and 8) so that rotation of the disc 71 effects rotation of the cam 70. The disc 71 is turn is secured to the top of a shaft 72, the lower portion of which is mounted upon a frame post 73. The shaft 72 and thus the attached disc 71 are free to rotate about the axis 74 of the shaft in the post 73.

The cam 70 also rotates about the axis 74 of the shaft 72. It consists of two arms, one 76 of which has an arcuate cam surface 75 defined thereon and the other 77 of which is generally rectangular in configuration. The arm 77 has a recess 78 machined therefrom which in part defines a continuation of the cam surface 75.

The cam surface 75 controls movement of a cam follower roller 80. This roller is secured to the lower end of a post 81, the upper end of which extends into and is fixedly secured to the rear of the lens-carrying platen 50. The follower 80 is spring biased into engagement with the cam surface 75 of the cam 70 by a tension spring 84, one end of which is connected to a bracket 86 which depends from the rear of the plate 50 and the other end of which is secured to the vertical frame plate 29 at the front end of the frame (FIG. 7). Consequently, rotation of the cam 70 results in the cam follower 80 moving axially toward and away from the rotational axis 74 of the cam 70.

A crank arm 90 controls axial movement of the camera platen 16. This crank arm is pivotally secured at one end to the arm 77 of the cam 70 and at the opposite end to a post 91 which depends from the bottom of the camera-carrying platen 16.

As may be seen most clearly in FIG. 8, the crank arm 90 is pivotally secured to the cam 70 by a vertical post 92 which extends upwardly from the arm 77 of the cam. A bushing or ball bearing 93 on the upper end of the post 92 rotatably supports one end 94 of the crank. The other end 95 of the crank is pivotally connected to the post 91, the upper end of which extends through a longitudinal slot 96 of the lens-carrying plate 50 and is fixed to the bottom of the camera-carrying plate 16.

Rotation of the disc 71 and thus of the cam 70 is controlled by an electric motor 99. There is a friction drive roller 100 on the outer end of the output shaft 101 of the motor 99 which is in driving frictional engagement with the bottom of the disc 71. A pinch roll (not shown) may be mounted over the top of the disc 71 to force the disc 71 downwardly into frictional driving engagement with the friction drive roller 100. To limit rotational movement of the disc to an arc of approximately 240°, a pair of limit switches 104 and 105 are mounted beneath the disc 71. These limit switches are engageable by a pair of stops 106 and 107 respectively which depend from the bottom of the disc to open a drive circuit (not shown) to the motor 99.

Referring now to FIGS. 1 and 7 it will be seen that the magnifying lens 14 is there shown in its lowest magnification position. In this position, the lens is as close as it can get to the television camera lens 110. In one preferred embodiment of the invention in which the lens has a focal length of approximately one-half inch, the image projected onto the vidicon tube of the television camera in this position of the lens 14 is approximately one-sixth the size of the object 13 viewed by the camera. When projected onto the screen of a television monitor (not shown) this one-sixth-size image becomes eight times the actual size of the object 13 viewed by the camera 12. In practice, the projected image on the monitor's screen might be a complete blueprint reduced in size to a two-inch square on a film chip. If the viewer then decides to read a detail on the blueprint or read a dimension off of it, he would locate the detail in front of the camera lens by moving the card 13 transversely or vertically and then magnifying that detail. To magnify the detail, the motor 99 is then driven so as to cause the disc 71 and attached cam 70 to move in a counterclockwise direction as viewed in FIG. 7. Initially, both the camera-carrying platen 16 and the lens-carrying platen move axially forwardly together over the guide rods 31, 32 as the magnification of the image viewed by the camera increases to a ratio of one to one. At this point, the axis of rotation of the post 92 crosses the longitudinal axis 102 of the camera and the lens. Thereafter, the magnification continues to increase as the lens-carrying carriage 15 moves forwardly toward the objective and the camera-carrying platen 16 moves rearwardly away from the objective to the position illustrated in FIGS. 3 and 6. In the preferred embodiment, at the upper end of the magnification range when the lens 14 is as close to the object 13 as it can get and the camera 12 is as far away from the objective as it is free to travel, the magnification of the image of the object viewed by the camera is approximately 6.8 times the size of the object being viewed. When viewed on the screen of the television monitor the magnification of the object being viewed is approximately 300 times the size of the object.

At the higher end of the magnification range, focusing of the vidicon tube of the television camera or of the image focal plane is critical and must be accurate to within a few thousandths of an inch. Consequently, the cam surface 75 must be generated with extreme accuracy. In the preferred embodiment, this cam surface is generated to an accuracy of 0.0005 inches. The generation of this cam surface is preferably accomplished by a computer into which the value of the focal length of the lens 14 is inserted as a constant and the value of the distance $D_o$ of the objective from the lens 14 is a variable. The computer then computes the value of the curved cam surface 75 as the variable $D_i$.

It is relatively easy and inexpensive to machine a plate cam to an accuracy of 0.0005 inches. While an appropriate cam surface may be generated on other styles of cams, they are more expensive to machine and more difficult if not impossible to maintain to an accuracy required for proper focusing at the great range of magnification provided by this invention.

One additional advantage of this invention is that it facilitates at relatively little expense the replacement of the lens and of the flat plate cam to vary the degree of magnification effected by the system. It also facilitates ease of service and ease of replacement of the camera on the flat top surface of the camera platen 16. As a result of the camera platen drive pin 91 extending through the longitudinal slot 96 in the lens-carrying plate 15, this variable-magnification system has a very high range of magnification in a very compact system. This mounting arrangement enables both the camera-carrying platen and the lens-carrying carriage to occupy the same axial spatial position because of their being able to slide axially past or over one another.

While the invention has been described in relation to a variable-magnification closed-circuit television system, persons skilled in the art will readily appreciate that the system is as applicable to film-type cameras as it is to television-type cameras. It is also readily adaptable to reader printers and/or projectors. Therefore, I do not intend to be limited except by the scope of the appended claims.

Having described my invention, I claim:

1. A variable-magnification optical viewing system for viewing a magnified objective, comprising
   a camera-supporting platen movable in a single axial plane,
   a camera mounted upon said platen,
   a lens-supporting carriage movable in the same axial plane as said platen,
   a lens mounted upon the carriage between the camera and the objective, gearless focusing means for continuously maintaining the focus of the objective as viewed by the camera throughout a magnification range which varies from less than one to more than one, said focusing means including means for moving the camera-supporting platen and the lens-supporting carriage in synchronization axially in said plane, said moving means comprising a rotatable flat plate cam and a cam follower engageable with the cam through an arc of less than 360°, said follower being secured to the lens carriage so that rotary movement of the cam effects precise axial movement of the lens carriage, and means interconnecting said cam to said camera platen so that precise camera-focusing movement of said platen occurs simultaneously with varying magnification movement of said lens carriage.

2. The optical viewing system of claim 1 wherein the means interconnecting said cam to said camera platen comprises a crank arm connected at one end to the camera platen and connected at the opposite end to the cam at a position spaced from the axis of revolution of the cam.

3. The optical viewing system of claim 2 wherein the connection between said crank arm and said camera-supporting platen extends through a slot in the lens-supporting carriage.

4. The optical viewing system of claim 1 wherein said lens-supporting carriage, and camera-supporting platen and said flat plate cam are all located in parallel horizontal planes and a portion of said carriage, platen and cam are all located in a common vertical plane.

5. The optical viewing system of claim 1 wherein said flat plate cam is fixedly secured to a rotatable disc, and means for rotating said disc comprising a pair of motor driven pinch rolls located adjacent the periphery of the disc.

6. The optical viewing system of claim 1 wherein said camera-supporting platen and said lens-supporting carriage are both slidable over the same pair of guide rods, said carriage and platen both having guideway means thereon connecting the carriage and the platen to the guide rods, said guideway means of said platen being movable past said guideway means of said carriage during magnification of an objective by the lens.

7. The optical viewing system of claim 6 wherein the guideway means of said platen comprises a series of bearings movable over one side of the guide rods and wherein the guideway means of said platen comprises another series of bearings movable over the other side of said rods.

8. The optical viewing system of claim 7 wherein the bearings comprise individual rollers, the guideway rollers of said platen being movable over the inside surface of said guide rods and the guideway rollers of said carriage being movable over the outside surface of said rods.

9. A variable-magnification optical viewing system for viewing a magnified objective, comprising a display device supporting platen movable in a single axial plane, a display device mounted upon said platen, said device having a display surface located in a image focal plane, a lens-supporting carriage movable in the same axial plane as said platen, a lens mounted upon the carriage between the display device and the objective, gearless focusing means for continuously maintaining the focus of the objective on the display surface throughout a magnification range which varies from less than one to more than one, said focusing means including means for moving the display device supporting platen and the lens-supporting carriage in synchronization in said axial plane, said moving means comprising a rotatable flat plate cam and a cam follower engageable with the cam through an arc of less than 360°, said follower being secured to the lens carriage so that rotary movement of the cam effects precise axial movement of the lens carriage, and means interconnecting said cam to said display device platen so that precise focusing movement of said platen occurs simultaneously with varying magnification movement of said lens carriage.

10. A variable-magnification optical viewing system for viewing a magnified objective, comprising a supporting platen movable in a single axial plane, a display device, said device having a display surface located in an image focal plane, a lens-supporting carriage movable in the same axial plane as said platen, a lens mounted upon the carriage between the display device and the objective, gearless focusing means for continuously maintaining the focus of the objective as viewed on said display surface throughout a magnification range which varies from less than one to more than one, said focusing means including means for moving the supporting platen and the lens-supporting carriage in synchronization in said axial plane, said moving means comprising a rotatable flat plate cam and a cam follower engageable with the cam through an arc of less than 360°, said follower being secured to the lens carriage so that rotary movement of the cam effects precise axial movement of the lens carriage, and means interconnecting said cam to said supporting platen so that precise focusing movement of said platen occurs simultaneously with varying magnification movement of said lens carriage.

11. The optical viewing system of claim 10 wherein said supporting platen and said lens-supporting carriage are both slidable over the same pair of guide rods, said carriage and platen both having guideway means thereon connecting the carriage and the platen to the guide rods, said guideway means of said platen being movable past said guideway means of said carriage during magnification of an objective by the lens.

12. The optical viewing system of claim 11 wherein the guideway means of said platen comprises a series of bearings movable over one side of the guide rods and wherein the guideway means of said platen comprises another series of bearings movable over the other side of said rods.

13. The optical viewing system of claim 12 wherein the bearings comprise individual rollers, the guideway rollers of said platen being movable over the inside surface of said guide rods and the guideway rollers of said carriage being movable over the outside surface of said rods.

14. The optical viewing system of claim 10 wherein the means interconnecting said cam to said supporting platen comprises a crank arm connected at one end to the platen and connected at the opposite end to the cam at a position spaced from the axis of revolution of the cam.

15. The optical viewing system of claim 11 wherein the connection between said crank arm and said supporting platen extends through a slot in the lens-supporting carriage.

16. The optical viewing system of claim 10 wherein said lens-supporting carriage, said supporting platen and said flat plate cam are all located in parallel horizontal planes and a portion of said carriage, platen and cam are all located in a common vertical plane.

17. The optical viewing system of claim 10 wherein said flat plate cam is fixedly secured to a rotatable disc, and means for rotating said disc comprising a pair of motor driven pinch rolls located adjacent the periphery of the disc.

18. A variable-magnification optical viewing system for viewing a magnified objective, comprising a supporting platen movable in a single axial plane, said platen including a plate located in a horizontal plane, a display, device, said device having a display surface located in an image focal plane, a lens-supporting carriage movable in the same axial plane as said platen, said carriage including a plate located in a horizontal plane, said carriage plate being movable beneath said platen plate during focusing movement of said carriage plate, a lens mounted upon the carriage between the display device and the objective, gearless focusing means for continuously maintaining the focus of the objective on the display surface throughout a magnification range which varies from less than one to more than one, said focusing means including means for moving the supporting platen and the lens-supporting carriage in synchronization in said axial plane, said moving means comprising a rotatable flat plate cam and a cam follower engageable with the cam through an arc of less than 360°, said follower being secured to one of said platen and carriage so that rotary movement of the cam effects precise axial movement of said one of said platen and carriage, and means interconnecting said cam to the other of said platen and carriage so that precise focusing movement of the other of said platen and carriage occurs simultaneously with varying magnification movement of said lens carriage.

19. The optical viewing system of claim 18 wherein the means interconnecting said cam to the other of said platen and carriage comprises a crank arm connected at one end to said other of said platen and carriage and connected at the opposite end to the cam at a position spaced from the axis of revolution of the cam.

20. The optical viewing system of claim 19 wherein the connection between said crank arm and said other of said platen and carriage extends through a slot in the said one of said platen and carriage.

21. The optical viewing system of claim 18 wherein said flat plate cam is located in a horizontal plane and in a common vertical plane with a portion of said carriage plate and said platen plate.

22. The optical viewing system of claim 18 wherein said flat plate cam is fixedly secured to a rotatable disc, and means for rotating said disc comprising a pair of motor driven pinch rolls located adjacent the periphery of the disc.

23. The optical viewing system of claim 18 wherein said supporting platen and said lens-supporting carriage are both slidable over the same pair of guide rods, said carriage and platen both having guideway means thereon connecting the carriage and the platen to the guide rods, said guideway means of said platen being movable past said guideway means of said carriage during magnification of an objective by the lens.

24. The optical viewing system of claim 23 wherein the guideway means of said platen comprises a series of bearings movable over one side of the guide rod and wherein the guideway means of said platen comprises another series of bearings movable over the other side of said guide rods.

25. The optical viewing system of claim 24 wherein the bearings comprise individual rollers, the guideway rollers of said platen being movable over the inside surface of said guide rods and the guideway rollers of said carriage being movable over the outside surface of said rods.

UNITED STATES PATENT OFFICE
CERTIFICATE OF CORRECTION

Patent No. 3,609,036            Dated September 28, 1971

Inventor(s) Warren D. Novak

It is certified that error appears in the above-identified patent and that said Letters Patent are hereby corrected as shown below:

Col. 1, line 29, change "system" to -- systems --.

Col. 2, line 29, change "can" to -- cam --.

Col. 3, line 65, change "care" to -- card --.

Col. 3, line 72, change "detain" to -- detail --.

Col. 3, line 75, after "in", add -- a --.

Col. 4, line 31, change "different" to -- differ --.

Col. 5, line 13, before "turn", change "is" to -- in --.

Col. 6, line 54, change "plate" to -- platen --.

Col. 7, line 26, after "carriage", change "and" to -- said --.

Col. 8, line 69, omit the comma after "a display" and before "device,".

Col. 10, line 20, change "rod" to -- rods --.

Signed and sealed this 4th day of April 1972.

(SEAL)
Attest:

EDWARD M. FLETCHER, JR.        ROBERT GOTTSCHALK
Attesting Officer              Commissioner of Patents